US012798974B2

(12) United States Patent
Reis Da Costa Labanca et al.

(10) Patent No.: US 12,798,974 B2
(45) Date of Patent: Nov. 17, 2026

(54) ATMOSPHERIC PLASMA REACTOR FOR THE LARGE-SCALE PRODUCTION OF CARBON NANOTUBES AND AMORPHOUS CARBON

(71) Applicants: Petróleo Brasileiro S.A.—Petrobras, Rio de Janeiro (BR); Serviço Nacional De Aprendizagem Industrial—Senai—DR/RN, Natal (BR)

(72) Inventors: Aurelio Reis Da Costa Labanca, Niterói (BR); Cláudio Fernandes Da Silva, Natal (BR)

(73) Assignees: Petróleo Brasileiro S.A.—Petrobras, Rio de Janeiro (BR); Servico Nacional De Aprendizagem Industrial—Senai—DR/RN, Natal (BR)

( * ) Notice: Subject to any disclaimer, the term of this patent is extended or adjusted under 35 U.S.C. 154(b) by 920 days.

(21) Appl. No.: 18/042,021

(22) PCT Filed: Aug. 17, 2021

(86) PCT No.: PCT/BR2021/050347
§ 371 (c)(1),
(2) Date: Feb. 17, 2023

(87) PCT Pub. No.: WO2022/036428
PCT Pub. Date: Feb. 24, 2022

(65) Prior Publication Data

US 2024/0010496 A1 Jan. 11, 2024

(30) Foreign Application Priority Data

Aug. 20, 2020 (BR) ...................... 10 2020 017034 1

(51) Int. Cl.
*C01B 32/16* (2017.01)
*B01J 19/08* (2006.01)

(52) U.S. Cl.
CPC ............ *C01B 32/16* (2017.08); *B01J 19/088* (2013.01); *B01J 2219/0809* (2013.01);
(Continued)

(58) Field of Classification Search
CPC ......... C01B 32/16; C01B 3/342; C01B 3/363; C01B 2203/0216; C01B 2203/0255;
(Continued)

(56) References Cited

U.S. PATENT DOCUMENTS 5,147,998 A * 9/1992 Tsantrizos ................ H05H 1/28 219/121.48
5,560,779 A * 10/1996 Knowles ............... C23C 16/276 219/121.52
(Continued)

FOREIGN PATENT DOCUMENTS

BR 9206894 A 11/1995
BR 0305309 A 8/2005
(Continued)

OTHER PUBLICATIONS

Li et al. (Feb. 25, 2017) "Experimental Comparison of Methane Pyrolysis in Thermal Plasma", Plasma Chemistry and Plasma Processing, 37:1033-1049.
(Continued)

*Primary Examiner* — Xiuyu Tai
(74) *Attorney, Agent, or Firm* — Morrison & Foerster LLP

(57) ABSTRACT

The present invention addresses to a plasma reactor for the thermal and/or plasmatic decomposition of hydrocarbon molecules aiming at the production of carbon nanotubes on a large scale, as well as amorphous carbon of superior
(Continued)

quality in terms of purity. Because it is operated at pressures close to the atmospheric pressure and can operate in a continuous flow regime, said reactor has a superior capacity for the production of carbon nanotubes. The hydrocarbon pyrolysis by means of thermal plasma or the heat derived therefrom produces carbonaceous material that presents a higher purity content than those obtained by the methods most used in the production of solid carbon, which are based, generally, on the burning of part of the load hydrocarbon.

8 Claims, 4 Drawing Sheets

(52) U.S. Cl.
CPC .................. *B01J 2219/0841* (2013.01); *B01J 2219/0871* (2013.01); *B01J 2219/0875* (2013.01); *B01J 2219/0898* (2013.01); *C01P 2004/13* (2013.01); *C01P 2004/64* (2013.01)

(58) Field of Classification Search
CPC ........ C01B 2203/061; C01B 2203/066; C01B 2203/0861; B01J 19/088; B01J 219/0809; B01J 2219/0841; B01J 2219/0871; B01J 2219/0875; B01J 2219/0898; C01P 2004/13; C01P 2004/64; H05H 1/24; H05H 1/26; H05H 1/32; H05H 1/48; H05H 1/28; H05H 1/34; H05H 1/3484; H05H 1/3468; H05H 1/3431; C23C 16/276; C23C 16/452; C23C 16/513; C10J 3/482; C10J 3/485; C10J 3/82; C10J 2200/09; C10J 2300/0983; C10J 2300/1238; C10J 2300/1618; C10K 3/003; C10K 3/006; C10K 3/008; F23G 5/085; F23G 2204/201
See application file for complete search history.

(56) References Cited

U.S. PATENT DOCUMENTS

| | | | |
|---|---|---|---|
| 5,997,837 | A | 12/1999 | Lynum et al. |
| 6,068,827 | A | 5/2000 | Lynum et al. |
| 2013/0039838 | A1 | 2/2013 | Lashmore et al. |

FOREIGN PATENT DOCUMENTS

| | | | |
|---|---|---|---|
| CN | 108675282 | A | 10/2018 |
| FR | 2813158 | A1 | 2/2002 |
| WO | 2020153685 | A1 | 7/2020 |

OTHER PUBLICATIONS

Shavelkina et al. (Jul. 31, 2016) "Effect of the Substrate Material on the Structure of Carbon Nanomaterials upon Synthesis in a Plasma Jet Reactor", Journal of Surface Investigation. X-Ray, Synchrotron and Neutron Techniques, 10(4):849-854.

* cited by examiner

ATMOSPHERIC PLASMA REACTOR FOR THE LARGE-SCALE PRODUCTION OF CARBON NANOTUBES AND AMORPHOUS CARBON

CROSS-REFERENCE TO RELATED APPLICATIONS

This application is a national stage application, filed under 35 U.S.C. § 371, of PCT International Patent Application No. PCT/BR2021/050347, filed Aug. 17, 2021, and entitled "ATMOSPHERIC PLASMA REACTOR FOR THE LARGE-SCALE PRODUCTION OF CARBON NANOTUBES AND AMORPHOUS CARBON," and claims benefit of and priority to BR Application No. 10 2020 017034 1, filed Aug. 20, 2020, the disclosures of all of which are incorporated herein by reference in their entireties.

FIELD OF THE INVENTION

The present invention addresses to a plasma reactor with application in the area of thermal decomposition of (light) hydrocarbon molecules, aiming at the production of carbon nanotubes on a large scale, as well as amorphous carbon of superior quality in terms of purity.

DESCRIPTION OF THE STATE OF THE ART

The production of hydrogen from a primary fuel, usually hydrocarbons, is known as reforming. It occurs in reformers (reactors) with the aid of catalysts. The hydrogen production process is classified according to the reactions involved in the production of the gas. There are four processes for producing hydrogen from (non-solid) hydrocarbons: steam reforming, reforming by partial oxidation, autothermal reforming and pyrolytic reforming.

The most used methods for the production of carbon in the solid state, or carbon black, as it is commercially known, are based on the burning of part of the hydrocarbon in the load, thus providing thermal energy to the pyrolysis reaction (thermal decomposition) of the natural gas, methane or other hydrocarbons.

The material produced by the partial combustion of the load, due to the characteristics of the process, does not have a purity level as high as that of the invention, which performs the pyrolysis of the hydrocarbon using thermal plasma or the heat therefrom.

Plasma pyrolysis of hydrocarbons, in addition to generating two products (hydrogen and carbon), is an alternative for decarbonizing fossil fuels. The objective is to evaluate its potential in reducing the emission of greenhouse gases. Plasma decarbonization can help in the development of cleaner processes in the carbon production industry, in hydrogen generation or even in electrical generation.

Carbon black, as it is commercially known, has high added value and great worldwide demand; in addition, plasma pyrolysis of light hydrocarbons, such as methane, provides superior quality carbonaceous materials that are unavailable in the current carbon black market.

The molecular breakdown of a hydrocarbon is thermally performed. There are methane pyrolysis processes that are used in the production of carbon black; in these, the energy needed to break down the $CH_4$ molecules is provided by the burning of methane itself.

An innovative alternative is the breakdown of molecules via plasma, capable of causing the decomposition of methane gas without burning the gas.

The generation of electrical discharges inside a reactor under appropriate conditions enables the formation of a plasma arc, which provides thermal energy for the decomposition of the hydrocarbon and adds a catalytic effect to the reaction due to the occurrence of collision processes between the present particles.

An important hypothesis of the proposed process is the possibility of obtaining carbon with a higher added value than conventional carbon blacks, such as special ones, or carbonaceous materials nanostructurally organized in carbon atoms, such as fullerenes and nanotubes.

Document PI0305309-1 discloses a plasma pyrolysis process aiming at producing gaseous hydrogen and solid carbonaceous material from the decomposition of hydrocarbons and alcohols, exemplified here for the decomposition of methane gas and its use. The process consists of supplying thermal energy to the hydrocarbon flow in sufficient quantity for its decomposition reaction. A flow of hydrogen gas is used, which is ionized (the plasma gas) and serves as a vehicle for the decomposition of the hydrocarbon. This flow is initially derived from an external source of hydrogen and subsequently composed of hydrogen generated by the hydrocarbon pyrolysis process itself. A source of direct current electrical energy provides the necessary energy for electrical discharges inside the reactor, in a region called plasma arc. The document, as well as the invention, discloses a process and method that use plasma for the decomposition of hydrocarbon (methane gas), producing carbon material; however, the invention uses argon gas as plasma gas and, with electric currents on the order of 5 at 20% of that used in the document (PI0305309-1), it is possible to obtain the same test conditions inside the chamber in the present invention. This is due to the different way of injecting the process gases, and also to the new design of the electrodes. The useful life of the electrodes of the present invention is longer, due to the electrical contact of the arc (root of the arc) in the cathode occurring entirely on the surface of the piece of tungsten with 2% thoria.

Document U.S. Pat. No. 5,997,837 discloses a method for the decomposition of hydrocarbons for the production of hydrogen and carbon black, in which the feed material is passed through a plasma torch, which causes a pyrolytic decomposition of the feed material. The feed material is conveyed through the plasma torch into a cooled inlet tube and undergoes first heating in an area in the immediate vicinity of the plasma flame. The material thus produced is passed on to one or more subsequent stages, where final and complete decomposition of hydrocarbons to carbon black and hydrogen takes place. In this area, additional raw materials can be added to quench and react with the already-produced carbon black. An increase is thus caused in particle size, density and quantity produced without supplying additional energy, and later the produced products are expelled and separated, and the hot gas can be conveyed in a return tube to the torch, in order to further increase the energy yield. The document, despite also disclosing a process and method that use plasma for the decomposition of hydrocarbon (methane gas), producing carbon material, the electrodes of the present invention are made of different materials, are more resistant and present geometric differences. Furthermore, the present invention makes use of different plasma gas, aiming at the production of carbon nanomaterials.

The present invention addresses to a plasma reactor aiming at the production of large-scale carbon nanotubes and amorphous carbon, different from what is disclosed by documents of the state of the art.

BRIEF DESCRIPTION OF THE INVENTION

The present invention addresses to a plasma reactor for the thermal decomposition of light hydrocarbon molecules aiming at the production of large-scale carbon nanotubes, as well as amorphous carbon of superior quality in terms of purity. Because it is obtained at pressures close to the atmospheric pressure, said reactor has a superior capacity for the production of nanotubes compared to methods that operate at low pressure.

In addition, the pyrolysis of hydrocarbons by means of thermal plasma or the heat derived therefrom presents a carbonaceous material with a higher purity content than those obtained by the methods most used in the production of solid carbon (Carbon Black), which are based in the burning of part of the hydrocarbon in the load. In addition, the useful life of the electrodes, as they are metallic and as a result of the electrical contact of the arc on the cathode occurring entirely in the piece of tungsten with 2% thoria, is at least three times greater than that of conventional carbon electrodes.

OBJECTIVES OF THE INVENTION

It is an objective of the present invention to produce carbon nanotubes on a large scale.

It is also an objective of the present invention to produce amorphous carbon of superior quality in terms of purity.

Yet another objective of the present invention is to provide an alternative for the decarbonization of fossil fuels.

Additional objectives of the present invention are related to the reduction of difficulties in assembly and disassembly of the torch, elimination of leaks in the cooling system, elimination of the problem of low thermal dissipation due to the large size of the anode that made its cooling difficult, among others that will be apparent to those skilled on the subject.

These and other objectives will be achieved by the plasma reactor object of the present invention.

BRIEF DESCRIPTION OF THE DRAWINGS

The present invention will be described in more detail below, with reference to the attached figures which, in a schematic way and not limiting the inventive scope, represent examples of the same. In the drawings, there are.

DETAILED DESCRIPTION OF THE INVENTION

Figure 1:
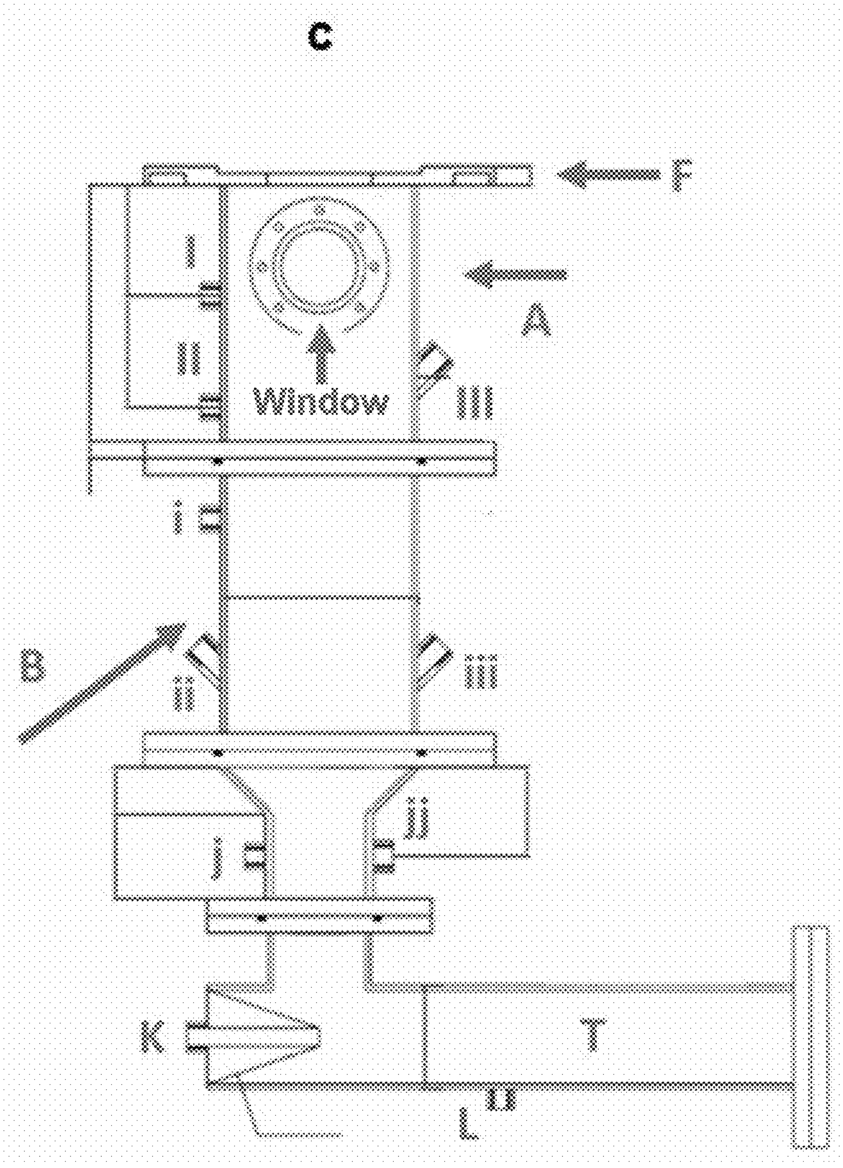
FIG. 1 illustrating the reaction chamber.

The plasma reactor (T+C) for the thermal decomposition of hydrocarbon molecules, aiming at the production of carbon nanotubes (E) on a large scale and amorphous carbon of superior quality in terms of purity, has a reaction chamber (C) made of stainless steel, as shown in FIG. 1. The chamber (C) consists of two sections, called the upper section (A) and the lower section (B).

Figure 2:
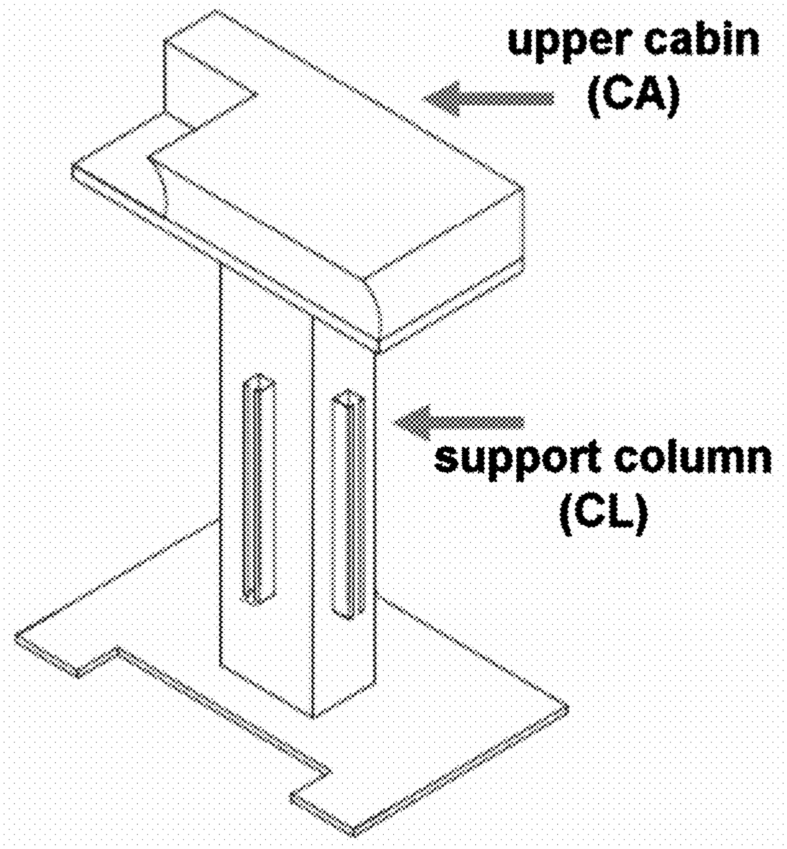
FIG. 2 illustrating the fastening structure of the plasma pyrolysis equipment.

The fastening structure of the plasma pyrolysis equipment (FIG. 2) was built in carbon steel. Its base was designed to ensure the stability of the structure, preventing it from toppling over with the weight of the electrode set (FIG. 3) and the reaction chamber (C). The base also has enough space to accommodate the electrical source and the thermostatic bath for cooling the electrodes.

The upper section (A) of the reaction chamber (C) has a window to enable the visualization of the electric arc and visual monitoring of the process throughout the reaction tests.

The lower section of the chamber (B) consists of only of a temperature sensor input (i) and two larger diameter inputs (ii, iii) that can be used for "QUENCHING", if necessary, or input for a pressure sensor or even temperature sensor.

The upper flange (F) was designed to ensure the coupling of the electrode system for generating the plasma torch (T). This section of the chamber (A) also contains two inputs for temperature sensors (I, II), equidistant from each other, and a third input with a larger diameter that can be used for "QUENCHING" (III) or for inserting a sensor for measuring the temperature at the boundary point between the two sections or even for monitoring the pressure downstream the reaction zone.

The plasma torch (T) is provided with an induced magnetic field, responsible for rotating the arc at a predetermined speed, which is an important factor to ensure a homogeneous temperature for the plasma gas at a low consumption of the electrode. The plasma torch (T) supplies the energy necessary for the breakdown of the hydrocarbon load. The radiation therefrom, as well as the heat convection from the plasma gas, provides enough energy for the hydrocarbons in the load to reach the complete pyrolysis temperature of methane molecules (~1000° C.). For the production of higher quality carbon materials, the process should preferably take place at temperatures above 2500° C.

Figure 3:
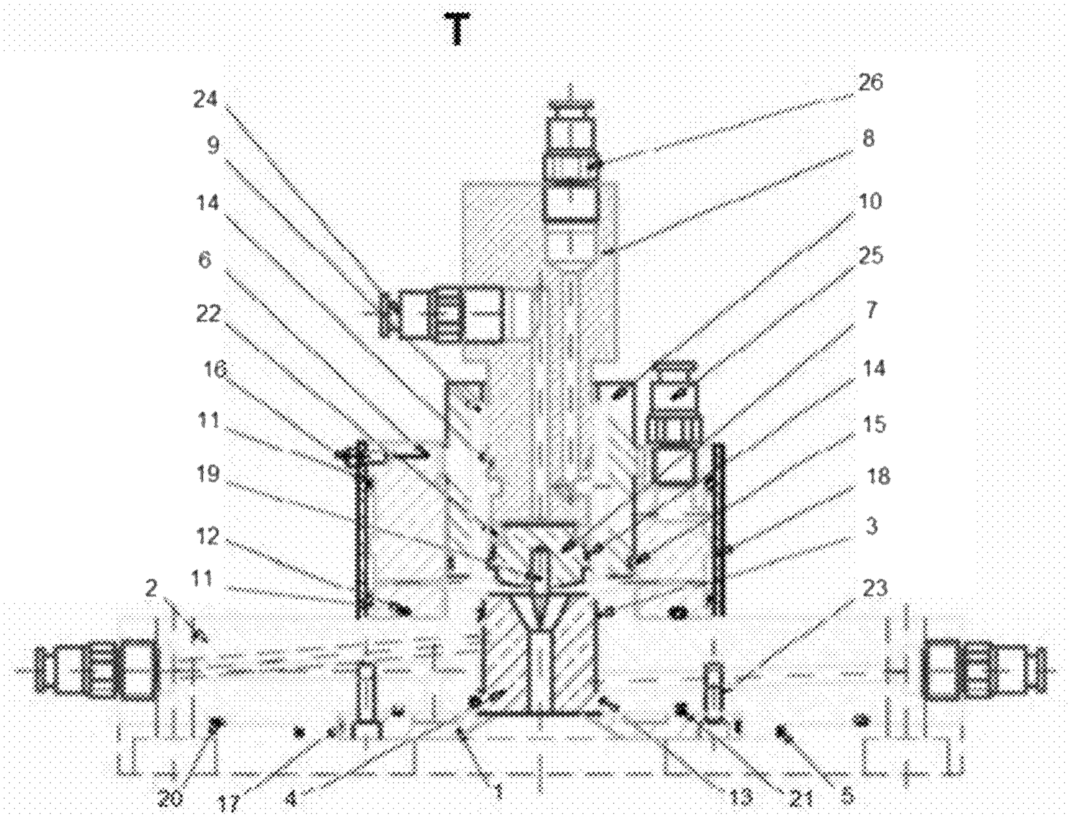
FIG. 3 illustrating the plasma torch.

In FIG. 3 (plasma torch), it is possible to observe the important components for the operation of the plasma torch (T), such as the injector (1), the coupling flange (2), the anode (4), the injection jacket (6), the cathode support (7), the cathode jacket (9) and the cathode (19), the cathode cooling (8), the insulator (10) and the outer jacket (18). Said injector (1) injects the gas in the axial direction.

After the two sections (A and B), there is a reduction from 4" (10.16 cm) to 2" (5.08 cm) with two more auxiliary inputs (j, jj), one for a temperature sensor and the other for a pressure sensor. This reduction converges to a horizontal tube (T) also of 2" (5.08 cm) with a gas injection nozzle (K) for "QUENCHING". This tube section also contains two auxiliary inputs, one for monitoring the gas temperature (L), before entering the gas/solid separation system, and the other for measuring pressure (K).

Figure 4:
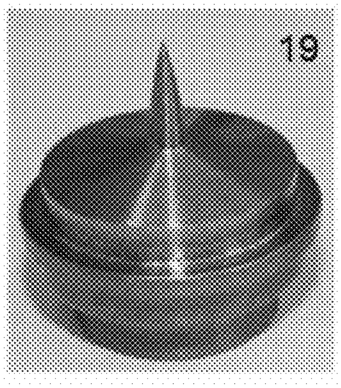
FIG. 4 illustrating an electrode (cathode)
Figure 5:
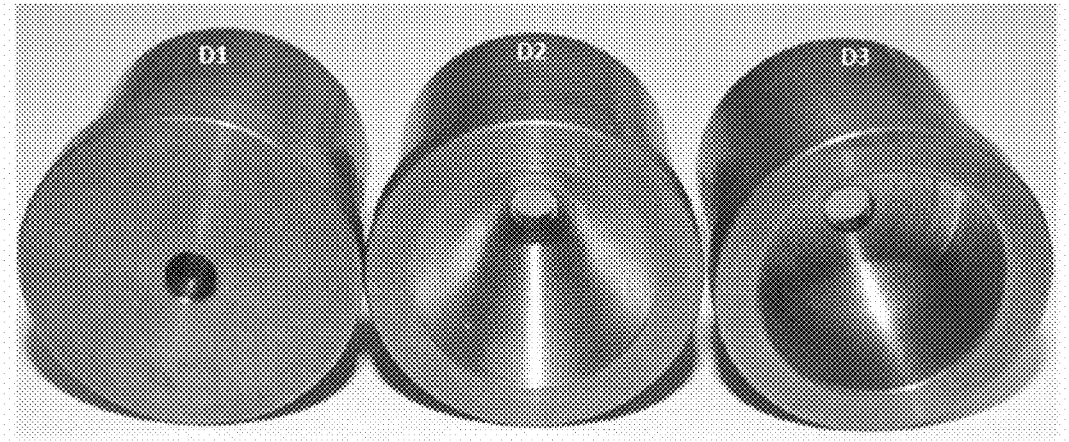
FIG. 5 illustrating the torch anodes in the straight (D1), conical (D2) and step (D3) shape.
Figure 6:
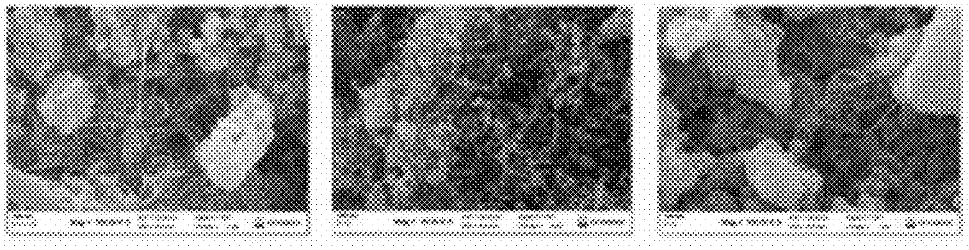
FIG. 6 with SEM images of produced carbon nanotubes (E).

FIG. 4 represents a cathode (19) and FIG. 5 the anodes (D1, D2, and D3), which, because they are metallic and due to the electrical contact of the cathode arc occur entirely in the piece of tungsten with 2% thoria, the electrodes have a service life at least three times longer than conventional carbon electrodes (U.S. Pat. No. 5,997,837) or another pair of metallic electrodes (PI0305309-1), even with temperatures inside the chamber at the same magnitude.

The new torch (T) features a superior design in terms of coupling between parts, more refined, where some parts are coupled through threads; the insert of tungsten with 2% thoria with forced adjustment in a copper piece forming what can be called a cathode (19), in addition to well-adjusted skirts for safe cooling of the electrodes. The new torch (T) also presents an improved design of the electrodes, which have a longer service life due to the precise thoriated tungsten insert in the cathode (19) (which forces the root of the electric arc to be located on the external surface of the insert of tungsten with 2% thoria, which works as a cathode—19) and new geometries for three different types of anode. The reaction chamber (C) was tested with the new plasma torch (T), obtaining temperatures inside the chamber (C) in the same magnitude, despite a lower energy consumption compared to PI0305309-1, and producing carbon in solid state.

Part of the electrical-electronic system will be installed in the support column (FIG. 2—CL) and in the upper cabin (FIG. 2—CA), which, in addition to the structural function, will serve as a cabin for passing power cables and installation of electronic components.

The upper cabin (CA) will be used to support the set of electrodes and to install pressure and temperature indicators, mass flow controllers, switches in general, starting buttons, stopping the electrical source and control device of the current provided to the system.

Considering the cold start, that is, from room temperature, of the reactor (T+C) developed in the design, it is possible to obtain about 1 g of high purity carbonaceous material, providing the argon plasma with an energy less than 1.2 kWh. The carbonaceous material to be obtained may have a high content of carbon nanostructures, such as carbon nanotubes (E), depending mainly on the temperature in the bed zone containing catalysts. It is possible to manufacture carbon nanotubes (E), when catalysts are used inside the reaction chamber (C), and to manufacture amorphous carbon, when catalysts are not used.

Argon gas was used as plasma gas, being maintained at an electrical discharge of about 5 to 50 A and 22 to 32 V. In all tests, the cathode (19) was cooled with water at a temperature of about 22 to 26° C. Alternatively, helium gas can be used as plasma gas.

The heat from the plasma arc is low in the radial direction and the highest temperatures are possible in the region (A) of the chamber (C) downstream of the plasma arc, preferably in the axial axis of the chamber (C). Therefore, the thermal decomposition of methane will occur mainly due to the heat from the plasma torch (T) in the axial direction.

It should be noted that, although the present invention has been described in relation to the attached drawings, it may undergo modifications and adaptations by technicians skilled on the subject, depending on the specific situation, but provided that within the inventive scope defined by the claims.

The invention claimed is:

1. An atmospheric plasma reactor comprising:

at least one reaction chamber made of stainless steel comprising upper and lower sections, wherein the upper section comprises two inputs for temperature sensors, a third input having a larger diameter than the two inputs, and a window, and the lower section comprises a temperature sensor input and two additional inputs having a larger diameter than the temperature sensor input, a plasma torch having an injector, a coupling flange, an injection jacket, a cathode support, an electrode containing a piece of tungsten with 2% thoria, an anode, a cathode cooling surface, a cathode jacket, an insulator, and an outer jacket.

2. The reactor of claim 1, further comprising catalysts inside the at least one reaction chamber to manufacture carbon nanotubes and, when no catalysts are inside the at least one reaction chamber, manufacturing amorphous carbon.

3. The reactor of claim 1, wherein an electrical contact of an arc on the electrode occurs entirely on a surface of the piece of tungsten with 2% thoria.

4. The reactor of claim 1, wherein the at least one reaction chamber is downstream of the plasma torch.

5. The reactor of claim 1, wherein the injector is for injecting gas in an axial direction.

6. The reactor of claim 5, wherein the injected gas is argon.

7. The reactor of claim 5, wherein the injected gas is helium.

8. The reactor of claim 6, wherein the gas is maintained at an electrical discharge of about 5 to 50 A and 22 to 32 V.

* * * * *